US008112062B2

(12) United States Patent
Pattabiraman (10) Patent No.: US 8,112,062 B2
(45) Date of Patent: Feb. 7, 2012

(54) SYSTEM AND METHOD FOR SENDING THRESHOLD NOTIFICATION IN REAL TIME (75) Inventor: Ravikumar Pattabiraman, Hillsborough, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 207 days.

(21) Appl. No.: 12/645,288

(22) Filed: Dec. 22, 2009

(65) Prior Publication Data
US 2011/0151831 A1    Jun. 23, 2011

(51) Int. Cl.
H04M 1/00    (2006.01)
(52) U.S. Cl. .................. 455/405; 455/406; 379/114.17
(58) Field of Classification Search .......... 455/405–408, 455/412.1, 412.2, 414.1, 414.3, 423.3, 466, 455/517, 566, 433, 461; 379/114.01–114.03, 379/114.09, 114.15–114.17, 114.19, 114.2, 379/121.02–121.04, 144.01–144.07, 130
See application file for complete search history.

(56) References Cited

U.S. PATENT DOCUMENTS

| | | | |
|---|---|---|---|
| 5,495,426 A * | 2/1996 | Waclawsky et al. .......... 709/226 |
| 6,473,500 B1 * | 10/2002 | Risafi et al. ............. 379/144.01 |
| 7,053,793 B2 * | 5/2006 | Tajima et al. ................. 340/928 |
| 7,366,136 B1 | 4/2008 | Kalbag et al. |
| 2002/0102962 A1 * | 8/2002 | Grinn et al. .................... 455/406 |
| 2003/0157925 A1 * | 8/2003 | Sorber et al. .................. 455/406 |
| 2004/0106393 A1 | 6/2004 | Chowdhury et al. |
| 2004/0236705 A1 * | 11/2004 | Shima et al. .................. 705/400 |
| 2005/0013423 A1 * | 1/2005 | Eversen et al. .......... 379/114.17 |
| 2006/0045245 A1 * | 3/2006 | Aaron et al. ................... 379/111 |
| 2006/0276170 A1 | 12/2006 | Radhakrishnan et al. |
| 2007/0260562 A1 * | 11/2007 | Hutson et al. ................. 705/412 |
| 2008/0250250 A1 * | 10/2008 | Westerinen et al. .......... 713/189 |
| 2008/0250476 A1 * | 10/2008 | Myers et al. ........................ 726/4 |
| 2009/0068980 A1 * | 3/2009 | Creswell et al. .............. 455/405 |
| 2009/0147670 A1 * | 6/2009 | Hu ................................. 370/216 |
| 2009/0196198 A1 * | 8/2009 | Zhang et al. .................. 370/252 |
| 2009/0254912 A1 * | 10/2009 | Roundtree et al. ............ 718/102 |
| 2010/0075630 A1 * | 3/2010 | Tillitt et al. ................... 455/406 |

FOREIGN PATENT DOCUMENTS

WO    WO 2004/023780 A1    3/2004

OTHER PUBLICATIONS cdma2000 Wireless IP Network Standard: Accounting Services and 3GPP2 RADIUS VSAs, 3RD Generation Partnership Project 2 "3GPP2", Version 2.0, Jul. 2005.
European Search Report issued in European Patent Application No. EP 10015961.5 dated Mar. 21, 2011.
cdma2000 Wireless IP Network Standard: Simple IP and Mobile IP Services, 3G 3rd Generation Partnership Project 2 "3GPP2", Jul. 2005, Version 2.0.

* cited by examiner

Primary Examiner — Dominic E Rego (57) ABSTRACT

A mobile station user is informed of reaching of at least one threshold level of data usage via a wireless communication network in real time. An account of the mobile station user has a maximum data plan limit defined by a user's plan and a data usage balance reflecting an amount of data usage remaining under the plan. When required data usage corresponding to requested data session does not cross the threshold level, a slice of data for the data session is allocated. When required data usage corresponding to the requested data session crosses the threshold level, reduced slice of data is allocated. Data usage is counted in real time during the data session, and a notification of reaching the at least one threshold level of data is sent to the mobile station in real time, at the time when data usage under the mobile station user's account reaches the at least one threshold level.

17 Claims, 4 Drawing Sheets

SYSTEM AND METHOD FOR SENDING THRESHOLD NOTIFICATION IN REAL TIME

FIELD OF THE INVENTION

The present subject matter relates to a method and a system for sending a real time notification that a threshold of available resources for a mobile station has been reached to the mobile station.

BACKGROUND

While initial implementation of mobile wireless communication supported voice communication services, the wireless communication services have since developed to provide packet data communication, with ever increasing transmission speed. The packet data communication allows mobile station users to expand the scope of their use of the mobile station, for example, to enjoy multimedia services, comparable to those enjoyed via Internet connected personal computers (PCs).

As the packet data communication has become prevalent, a form of payment for data communication services, prepaid communications services, in which a customer or subscriber have fixed availability of usage of a resource. Such services now encompass an array of mobile wireless communications. In an example of a prepaid wireless service, the customer may purchase blocks of time or amounts of data for making voice telephone calls or data communication via a cellular telephone network or postpaid model in which fixed fee will be applied for available resource after which the fee will increase. Upon connecting to the wireless communications network, the customer account is authorized and authenticated, and the network allows a voice or data call to proceed. The network monitors the customer's usage time or data and decrements from the customer's account. If the account becomes depleted or reaches the billing cycle limits, the system can either prompt the customer to purchase more time, or the system can terminate the call. The wireless communications system enables the customer to budget an amount of airtime that will be used during a certain period of time, and to insure that the budget will not be exceeded unless the customer desires more airtime. The wireless service provider likes this type of service, because the carrier receives payment in advance and need not run the risk that the customer will default on a bill, and also brings great value to the service provider even with fixed resource options in terms of revenue. Since data communication may be terminated without notice or price for usage of data communication may increase when the prepaid or postpaid account depletes, the customers want to be advised about reaching data plan limit set by their service plans in advance of reaching the data plan limit.

In another aspect, since most recent packet data communication users are young users, parents of the young users would like to keep track of and control usage of packet data communications of their children. As a way to control usage of data communication by their children, the parents need to receive notifications of reaching the data plan limit or a pre-set usage limit.

To address these needs for people to receive notifications of reaching a data plan limit or a pre-set usage limit, some wireless communication service providers provide notifications of reaching the data plan limit to the customers. The wireless communication service providers, however, do not provide notifications of reaching a data plan limit during a data communication session, since the amount of use of data plan limit is checked only after the end of each data communication session. In addition, the wireless communication service providers take an initiative in sending the notification upon reaching the limit, but the customer cannot set an arbitrary threshold of data usage at which the notification would be sent to the customer at his disposal.

Hence, a need exists for a method and a system for providing a notification of reaching a data plan threshold to a mobile station customer in a real time when the data plan limit is reached.

Another need exists for a method and a system for providing a notification of reaching a data plan threshold to a mobile station customer which allows the customer to set the threshold of the data usage amount at which the notification is sent to the customer.

SUMMARY

The teachings herein address one or more of the above noted needs relating to sending a threshold notification to notify a mobile station user of about level of depletion of data amount limit set under her or his prepaid data plan.

An aspect of the disclosure encompasses a method for notifying a mobile station user of reaching of at least one threshold level of data usage via a wireless communication network. An account of the mobile station user has a maximum data plan limit defined by a user's plan and a data usage balance reflecting an amount of data usage remaining under the plan.

Responsive to one or more data sessions of the user's mobile station, requests for allocation of a slice of data usage from the data usage balance under the user's plan is received from a node of a mobile wireless communication network and data communication of the user's mobile station are routed through and monitored through the node. In response to each request, it is determined if data usage corresponding to the requested slice would cross the threshold level of data usage.

For a request where the data usage corresponding to the requested slice would not cross the threshold level of data usage, the requested slice is allocated and the requested slice is sent to the node as a quota for data usage of the mobile station. For a request where the data usage corresponding to the requested slice would cross the threshold level of data usage, a reduced slice equal to the difference between a starting value of previously consumed data under the user's plan and the threshold is allocated, and the reduced slice to the node is sent as a quota for data usage of the user's mobile station during a respective data session.

Upon receiving a message from the node indicating that data usage of the user's mobile station during the respective data session has consumed the reduced slice, so that data usage of the user's mobile station has reached the threshold, a notification of reaching the threshold is sent to the mobile station in real time.

The threshold may be set by the mobile station user. The threshold may include multiple thresholds, and multiple notifications of reaching the multiple thresholds may be sent to the mobile station in real time, at the time when the data usage has reached the multiple thresholds.

The notification is in a form of a Short Message Service (SMS) message, a Multimedia Messaging Service (MMS) message, or a voice message. The notification is sent at the time when the data usage reaches the threshold level of data without a time gap between the time at which the threshold is reached and the time of sending the notification.

The data usage is counted by a Packet Data Serving Node (PDSN) to route traffic flowed between the mobile station and the mobile wireless communication network. The threshold is less than the maximum data plan limit.

Another aspect of the disclosure encompasses a system for notifying a mobile station user of reaching of a threshold level of data via a wireless communication network. An account of the mobile station user has a maximum data plan limit defined by a user's plan and a data usage balance reflecting an amount of data usage remaining under the plan. The system receives a request for allocation of a slice of data usage from the data usage balance in response to a request for a data session from a node of the wireless communication network.

The system comprises a Packet Data Serving Node (PDSN), a usage control server, and a Customer Communication Enterprise Service (CCES) server. The PDSN routes traffic including the request for allocation of a slice of data and the data session, counts amount of data transmitted between the mobile station and the resource in real time, and updates the data usage balance reflecting the counted amount of data transmitted in real time.

The usage control server, in response to the data session request, determines if data usage corresponding to the requested slice would cross the threshold level of data usage, and decides to send a threshold notification at the time when the data usage balance reaches the threshold level of data. The usage control server allocates the requested slice and sends the requested slice to the node as a quota for data usage of the mobile station for a request where the data usage corresponding to the requested slice would not cross the threshold level of data usage, and the usage control server allocates a reduced slice equal to the difference between a starting value of previously consumed data under the user's plan and the threshold, and sends the reduced slice to the node as a quota for data usage of the user's mobile station during a respective data session for a request where the data usage corresponding to the requested slice would cross the threshold level of data usage. The CCES server sends the threshold notification to the mobile station in response to the usage control server's decision to send the notification.

The system may further include an Authentication, Authorization and Accounting (AAA) server for receiving a request for access to data communication services provided by the wireless network from the PDSN and permitting the access to the data communication services by referring to profile of the mobile station user, and an Enhanced Service Manager (ESM) gateway connected to the usage control server for providing an interface for setting the threshold level of data by the mobile station user.

Another aspect of the disclosure encompasses a processor-readable medium tangibly embodying a set of processor-executable instructions. Execution of the instructions causes a processor to perform operations for notifying a mobile station user of reaching a threshold level of data via a wireless communication network. An account of the mobile station user has a maximum data plan limit defined by a user's plan and a data usage balance reflecting an amount of data usage remaining under the plan.

Responsive to one or more data sessions of the user's mobile station, requests for allocation of a slice of data usage from the data usage balance under the user's plan are received from a node of a mobile wireless communication network. Data communication of the user's mobile station are routed through and monitored through the node. In response to each request, it is determined if data usage corresponding to the requested slice would cross the threshold level of data usage.

For a request where the data usage corresponding to the requested slice would not cross the threshold level of data usage, the requested slice is allocated, and the requested slice is sent to the node as a quota for data usage of the mobile station. For a request where the data usage corresponding to the requested slice would cross the threshold level of data usage, a reduced slice equal to the difference between a starting value of previously consumed data under the user's plan and the threshold is allocated, and the reduced slice is sent to the node as a quota for data usage of the user's mobile station during a respective data session.

Upon receiving a message from the node indicating that data usage of the user's mobile station during the respective data session has consumed the reduced slice, so that data usage of the user's mobile station has reached the threshold, a notification of reaching the threshold is sent to the mobile station in real time.

The threshold level of data may be set by the mobile station user. The threshold includes multiple thresholds, and multiple notifications of reaching the multiple thresholds are sent to the mobile station in real time, at the time when the data usage has reached the multiple thresholds. The notification is in a form of a Short Message Service (SMS) message, a Multimedia Messaging Service (MMS) message, or a voice message.

The notification is sent at the time when the data usage reaches the threshold level of data without a time gap between the time at which the threshold is reached and the time of sending the notification. The data usage is counted by a Packet Data Serving Node (PDSN) to route traffic flowed between the mobile station and the mobile wireless communication network. The threshold is less than the maximum data plan limit.

BRIEF DESCRIPTIONS OF DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed herein relate to notifying a mobile station user of reaching a threshold level of data, which alerts the user of depletion of his or her pre-set data usage limit. The user is registered to data plan, which allots the user a preset maximum data plan limit beyond which the user may not enjoy the data communication services or may have to pay penalty for the data services. An account of the mobile station user has a data usage balance reflecting an amount of data usage remaining under the plan.

Upon request for one or more data sessions from a user's mobile station which has a corresponding slice of data, it is determined if data usage corresponding to the requested slice would cross the threshold level of data usage. When the data usage corresponding to the requested slice would not cross a threshold level of data usage, the requested slice is allocated, and allocated slice of data is transmitted for the requested data session. When the data usage corresponding to the requested slice would cross the threshold level of data usage, a reduced slice equal to the difference between a starting value of previously consumed data under the user's plan and the threshold is allocated, and the reduced slice of data is permitted to transmit for the requested data session.

Once data usage of the user's mobile station during the respective data session has consumed the reduced slice, so that data usage of the user's mobile station has reached the threshold, a notification of reaching the threshold is sent to the mobile station in real time.

Figure 1:
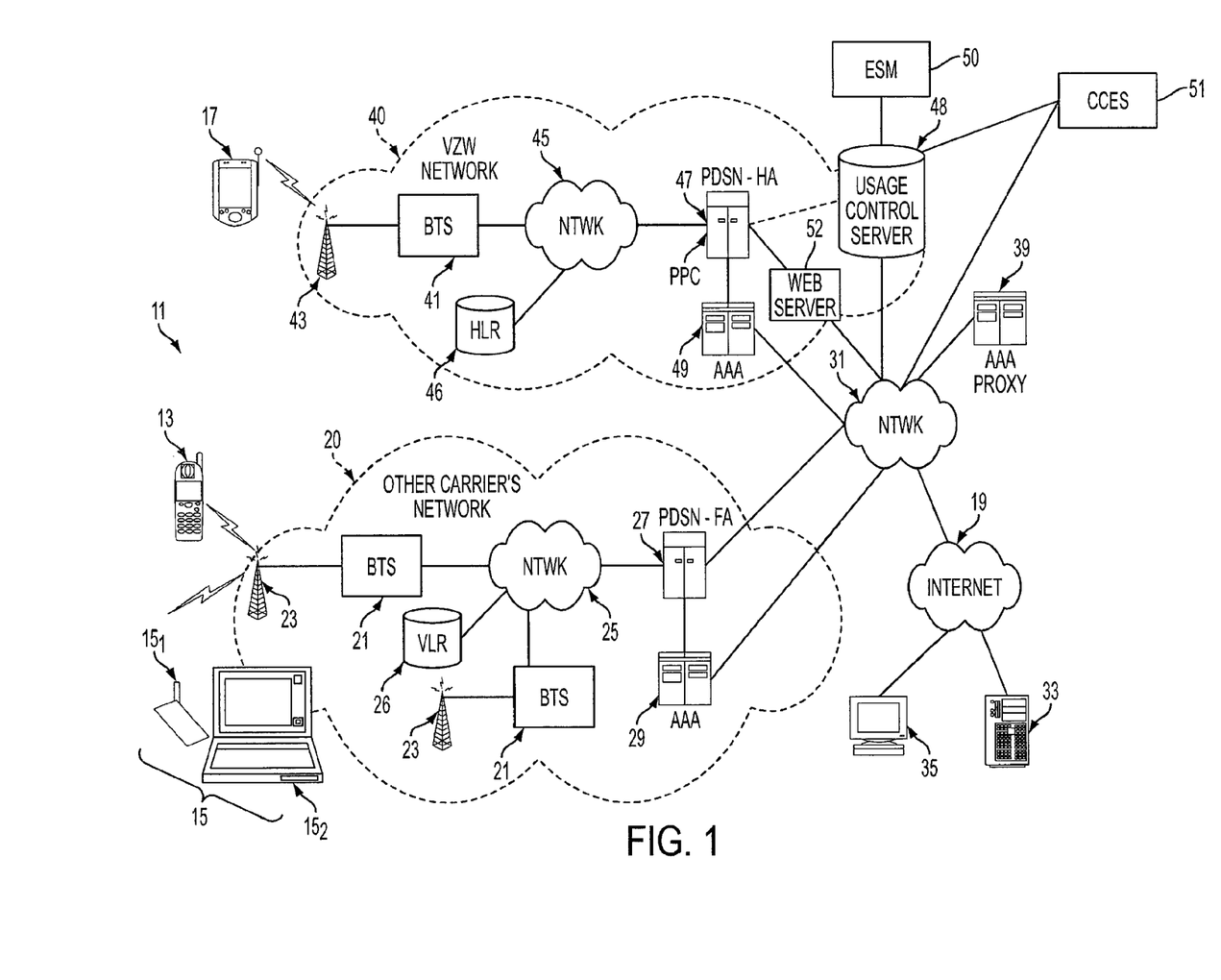
FIG. 1 is a functional block diagram of an exemplary system 11 of wireless networks for providing mobile voice telephone services and data services.

FIG. 1 is a functional block diagram of an exemplary system 11 of wireless networks for providing mobile voice telephone services and data services. The present concepts are applicable to a variety of different wireless technologies supporting packet data communications services, such as WiFi, WLAN, 1xRTT, GSM/GPRS, UMTS and EVDO.

The communication networks implementing system 11 provide mobile voice telephone communications as well as packet data services, for numerous mobile stations. For purposes of later discussion three mobile stations 13, 15 and 17 appear in the drawing, to represent examples of several different types of the mobile stations that may receive different packet data services via the system 11. The station 13, for example, may take the form of a mobile telephone station, enhanced with display and user input capabilities to support certain text and image communications, such as email, picture communication and web browsing applications. Today, such mobile telephones typically take the form portable handsets, although they may be implemented in other form factors.

The station 15 is a portable computing device, specifically, comprising a wireless modem card $15_1$ inserted into a handheld or laptop personal computer (PC) $15_2$ or the like. Although shown as a separate card, the modem $15_1$ may be integrated into the PC $15_2$ Alternatively, the PC $15_2$ may connect to a handset device, similar to the handset type mobile station 13. The station 17 takes the form of a personal digital assistant (PDA) or BlackBerry type device incorporating a wireless transceiver compatible with the particular type of packet data service offered by the system 11. Of course, the mobile stations with packet data communication capabilities may take other forms or connect to a variety of other data devices that may enable use of the network communication services.

The system 11 may allow users of the mobile stations to initiate and receive telephone calls to each other as well as through the public switched telephone network (not shown). For purposes of this discussion, the system 11 enables any and all users of the mobile stations 13, 15 and 17 to initiate and receive various packet switched data communications, for example to or from the public data network 19 referred to as the Internet. Some of the users of the mobile stations will subscribe to voice and/or data services under one or more postpay service plans offered by a carrier or service provider.

However, the users or subscribers of other stations will subscribe to voice and/or data services under a plan, in which they pay in advance for an amount of communication service usage. In the examples, usage is measured by duration, e.g. length of time of a circuit switched voice call or length of time of a data communication session or volume of the consumed data.

The packet data services through the system 11 may allow communications with other networks such as private intranets (not shown). The packet data communications allow users of the mobile stations to send to or receive data from other digital devices that otherwise have access to the Internet 19, such as servers 33, hosts and personal computers 35 coupled to the Internet 19, as well as to or from other mobile stations.

The system 11 provides the various wireless communication services in accord with at least one digital radio protocol although for voice telephone services, the network may also support one or more legacy analog or digital protocols. The illustrated system 11 supports a variety of multimedia voice and data services, using digital packet communications over the air link. In an EVDO implementation, supported services include Voice over IP (VoIP) type telephone communications, as well as high-speed web browsing, just to name two exemplary services. In a 1xRTT implementation, the system would carry voice communications as separate circuit switched communications, although those communications also typically utilize a digital communication protocol.

The system 11 may comprise access networks operated by a large number of separate and independent service providers or "carriers." For discussion purposes, the drawing shows two such radio access networks (RANs) 40 and 20, which we will assume are operated by two different carriers (VZW and another carrier), although those skilled in the art will recognize that large carriers operate a number of such networks and that many countries have more than two mobile carriers that offer or soon will offer packet data communication services. Through the carriers' access networks 20 and 40, the overall system 11 offers mobile communications to customers using mobile stations throughout a wide geographic area.

Physical elements of a radio access network (RAN) 20, operated by one of the other carriers, include a number of base stations represented in the example by the base transceiver systems (BTS) 21, each of which communicates via an antenna system at the site of base station 23 and the air-link with one or more of the mobile stations 13, 15 and 17, when the mobile stations are within range. Each base station typically includes a BTS 21 coupled to several antennae mounted on a radio tower within a coverage area often referred to as a "cell." The BTS 21 is the part of the radio network that sends and receives RF signals to/from the mobile stations that the base station currently serves.

The network 20 also includes a traffic network 25, which carries the user communications for the mobile stations 13, 15 and 17. In a 1xRTT implementation, the network 25 includes a number of radio access network switches, typically modern versions of mobile switching centers (MSCs) or Mobile Telephone Switching Offices (MTSOs), which support both cellular voice and packet data services. Each such switch connects through trunk circuits (not shown) to a number of the BTS base station transceivers 21, which the respective switch serves and controls. In an EVDO (evolution data only) implementation, the network 25 is a high-speed packet switched data network comprising a number of packet switches/routers connected to the BTS base station transceivers 21.

The BTS 21 at a base station assigns and reassigns channels to the mobile stations 13, 15 and 17 that it serves and monitors the signal levels to recommend hand-offs to other base stations. The network 25 typically includes a base station controller (BSC) functionality that controls the functions of a number of base stations and helps to manage how calls made by each mobile station are transferred (or "handed-off") from one serving base station to another. Each wireless network equipment vendor implements this function differently. Some vendors have a physical entity, which they call a BSC, while other vendors include this functionality as part of their switch (not shown).

The network 20 also includes a number of Packet Data Serving Nodes or "PDSNs" 27 coupled to the traffic network 25. The PDSN is a fixed network element introduced in the architectures for 3g wireless networks, to support packet-switched data services. Each PDSN 27 establishes, maintains and terminates logical links to the associated portion of the radio access network 20. The PDSNs also support point-to-point (PPP) sessions with the mobile stations. The PDSNs provide the packet routing function from the radio network to/from other packet switched networks, represented generally by the private network 31 of the carriers and the Internet 19, in the drawing.

The PDSN 27 initiates Authentication, Authorization and Accounting (AAA) communications to an AAA server 29, for example, via a secure private packet network (not separately shown), for each mobile station client seeking packet communications. The server 29 provides Authentication, Authorization, and Accounting (AAA) functions for packet data calls in a cdma2000-1×(1×RTT) type network or an EVDO type network, such as the network 20. Such servers authorize service subscriptions, service profiles, and customized services. The AAA server 29 also performs a variety of accounting functions, including starting an accounting record, maintaining an interim accounting record, and stopping an accounting record, for each packet data communication service session in response to various messages from the PDSN(s) processing the data session. The PDSN 27 receives service parameters for the mobile station, operating as a mobile client, from the AAA server 29. The PDSN 27 also counts traffic of packet data transmitted to the mobile station 17 or collects usage data for accounting purposes, which it relays to the AAA server 29.

In a 1×RTT network implementation, the network 25 utilizes switched digital links through MSC or MTSO types switches, and the network 31 is a separate packet switched data network formed of packet routers/switches and appropriate interconnected packet links. In an EVDO implementation, the network 25 is a packet network, and the link or network to the AAA server 29 may utilize the same routers/switches and links to carry the various packet communications.

Although different radio access networks may utilize different technologies or architectures, for discussion purposes it is assumed that the RAN 40 is generally similar to the RAN 20. Like the network 20, the physical elements of the radio access network (RAN) 40, include a number of base stations represented in the example by the base transceiver system (BTS) 41. Each BTS 41 communicates via an antennae system at the site of base station 43 and the air-link with one or more of the mobile stations, 15 and 17, when the mobile stations are within range. The network 40 also includes a traffic network 45, which carries the user communications for the mobile stations 13, 15 and 17. As in the network 20, the traffic network 45 may utilize modern versions of mobile switching centers (MSCs) or Mobile Telephone Switching Offices (MTSOs), which support both cellular voice and packet data services; or the network 45 may utilize a number of packet switches/routers to provide a high-speed packet switched data network.

The network 40 also includes a number of Packet Data Serving Nodes or "PDSNs" 47 coupled to the traffic network 45. The PDSN 47 has a connectivity to the outside network 31 via a web server 52 which is a gateway to provide webpages to user's mobile station 17 or PC 15. The PDSN 47 performs functions similar to those of the PDSN 27 in the network 20, both to provide packet switched routing services and to perform the validation and billing related functions. The PDSN 47 specifically counts traffic amount to be flowed to each of mobile stations 17 to determine whether a threshold for data plan has been reached, details of which will be discussed later. The network 40 also includes an Authentication Authorization and Accounting (AAA) server 49, analogous to the server 29.

The illustrated system 11 supports a range of packet data services. The packet data communications can support traditional data applications, such as browsing the Internet 19 and email communications to/from remote computers, represented generally by the server 33 and/or the personal computer (PC) or other workstation device 35. The packet data communications through the network 11 also can support Voice over IP (VoIP) type packet applications. The computer 35 and the server 33 are intended as general examples of classes of devices that may participate in data communications to/from the users' mobile station devices 13, 15, 17, both for traditional data communications and for VoIP applications. VoIP applications may also provide transport for audio communications between mobile stations, e.g. for a push-to-talk (PTT) type service.

Different customers subscribe to service through different providers and are assigned to specific radio access networks (RAN's) 20 or 40 as their home networks; and the mobile stations and network elements are provisioned accordingly. Those skilled in the art will understand that the system 11 will provide services for many customers through their mobile stations, although for simplicity, only three mobile stations are illustrated. For discussion purposes, assume that mobile stations 13 and 17 belong to customers of the access provider network 40. For discussion purposes only, the home carrier is referred to as carrier "VZW," therefore the network 40 is the VZW network. The subscribers owning stations 13 and 17 are VZW customers, whereas the subscriber owning station 15 is a customer of the other carrier. Hence, stations 13 and 17 are 'homed' on the network 40. Similarly, the mobile station 15 is homed on the network 20 of the other carrier.

As shown, mobile station 17 is operating within the service area of its home access provider network 40. By contrast, the VZW customer using the mobile 13 has roamed out of the service area of its home access provider network 40 and into a different geographic area, where the mobile station 13 is receiving wireless service from a different access provider network referred to as the "visited" access provider network, in this case, a network 20 operated by the other carrier.

For voice communication services, some implementations (e.g. for 1×RTT) of the wireless network 40 include a Home Location Register (HLR) 46, which stores data regarding the valid station's identification, the assigned telephone number, subscription service options terminal capabilities, etc. The home network 40 uses the service information from the HLR 46 to provide the subscribed services to each user's mobile station, for example, while the station 17 is operating in the service area of the home network. Although the HLR 46 may reside in an MSC or other switch, today, the HLR typically runs as an application/database on a separate computer coupled for packet signaling communication via the SS7 network (not shown). In some networks, the computer or server providing the HLR functionality is referred to as a Service Control Point (SCP). Of course, there may be multiple computers distributed throughout the network for performing the HLR function. In some implementations, the SCP functionality is incorporated into an MSC or into a switch or router of the packet network providing the SS7 signaling communications. Other implementations provide packet communications to and from the element serving as the HLR via IP networking.

As a customer roams, the mobile station 13 registers in service areas other than the home area. To facilitate roaming and attendant registration for voice services, each network also implements a Visitor Location Register (VLR), such as the VLR 26 shown in the roaming other carrier's network 20. VLRs typically reside in the MSCs although the function may be implemented in other network nodes. The VLR 26 and the HLR 46 interact to validate the roaming mobile station 13. For a validated station 13, service information for that station is downloaded from the HLR 46 to the VLR 26 in a visited access network 20 during a successful registration process. The validation process also provides information to the HLR 46 indicating the current location of the station 13, in this case, within the network 20, to allow the home network 40 to route incoming voice calls to the station 13 at its current location.

The AAA servers interact to provide similar validation and location update functions, for packet data communication services. Authentication, Authorization, and Accounting (AAA) servers 29 and 49 are used for Authentication, Authorization and Accounting functions for packet data calls. Both access networks 20 and 40 include one or more such servers 29 and 49; and there may be one or more third party trusted AAA servers 39 that serve as proxies for communications between AAA servers of different carriers. As noted, the AAA servers provide authentication for roaming mobile stations that request packet data communications services, such as the station 13. The home server 49 also maintains data derived from the validation process, which provides an up to date indication of the point of attachment of the roaming station 13 to a wireless network, such as to the visited network 20.

In the preferred implementation of the system 11, all authentication, authorization and accounting transactions are performed using the RADIUS (Remote Authentication Dial-User Service) protocol. RADIUS protocol has been in use for many years and is used widely in the ISP (Internet Service Provider) networks. In the network 20, RADIUS is implemented on a client-server model in which the PDSN 27 acts as the client and AAA 29 acts as the server. Similarly, in the network 40, RADIUS is implemented on a client-server model in which the PDSN 47 acts as the client and AAA 49 acts as the server.

During registration of roaming subscribers, it becomes necessary to conduct certain transactions between AAA servers 29 and 49. These communications may be conducted directly via the IP network 31 or the like. In many cases, however, the AAA server 29 or 49 in each respective network 20 or 40 will communicate via the IP network 31 with a secure broker server 39 acting as an AAA proxy server. The IP network 31 could be a public network, such as a portion of the public Internet. However, because of the mission-critical nature of the AAA communications and the security and finance-related issues involved in such communications, the IP network 31 preferably is a secure packet communication network operated by one or more of the carriers or their trusted service providers.

In a typical data session, the AAA functionality also provides user authentication, usually in the form of a challenge and response procedure to obtain and validate a user ID and password. In the visited network 20, the AAA server 29 communicates with the AAA server 49 in the home network (possibly via proxy 39) to validate user ID and password information received from the user of the roaming station 13. Often, the data session may be considered to "start" when the user log-in is successfully completed. The data session "ends" when the user logs off or the session is terminated, e.g. due to interruption of packet communications to/from the mobile station 13.

The network 11 may provide Simple IP (SIP) address assignment, Mobile IP (MIP) address assignment, or both. The prepaid data service(s) in the example, however, will utilize the MIP address assignment technique, and the duration measured for accounting purposes will be that of the MIP session. MIP is a service in which the subscriber is assigned an IP address from a "home" network. With the MIP service, the assigned IP address does not change as the mobile station changes its point of attachment to the network (e.g. by roaming across a PDSN service boundary). If MIP assigned, the IP address remains assigned to the particular mobile station until that station logs-off, is inactive for longer than some set period, or the data session is otherwise terminated. MIP address service enables routing of packets between PDSNs 27 and 47, to effectively enable roaming between service areas of different PDSNs. Start of the session for accounting purposes coincides with MIP assignment of a home IP address to the station, for its use during the session.

A usage control server 48 performs a variety functions related to controlling usage of packet data communication for the mobile stations. The usage control server 48 stores information of data usage for each mobile station user such as each user's data usage limit set by each user's data plan and thresholds of data for sending notification of usage depletion for each mobile station user. The usage control server 48 sends quota/slice of data and a threshold for that data slice assigned to a data session requesting mobile station to the PDSN 47 upon receiving the request of the data session. The PDSN 47 checks a remaining data slice threshold or amount of data assigned to the mobile station user continuously during the data session, and informs the usage control server 48 that the remaining data slice threshold has been reached and also sends the exact consumed amount of data. The usage control server 48 updates counting of data, and allocates a new data slice and a data threshold for the requested data session based on availability of more data resource.

After receiving information of the consumed data from the PDSN 47 depending on whether the remaining quota or amount assigned to the mobile station user is enough for permitting the requested data session. The usage control server 48 checks if the requested data session requires more than a total remaining data equal to a difference between the remaining balance after data consumed in the previous slice, and the notification threshold of data. If the requested data session requires the total remaining data, the usage control server 48 decides to send a real-time threshold notification to the mobile station 17.

An Enhanced Service Manager (ESM) gateway 50, which is connected to the usage control server 48, provides the mobile station user with an interface via an Application Programming Interface (API) to set options regarding the threshold notifications and monthly usage allowance of each user on his or her own. For example, the interface may be provided in a form of application interface implemented by a software stored in the mobile station to the mobile station or webpages in which the mobile station user inputs his or her own conditions for sending threshold notifications. The ESM gateway 50 communicates with the usage control server 48, by which the usage control server 48 receives the user's input on the conditions for sending threshold notifications.

A Customer Communication Enterprise Service (CCES) server 51 connected to the usage control server 48 sends the threshold notifications to the mobile station 17 under control of the usage control server 48. The notifications may take form of Short Message Service (SMS) messages, Multimedia Messaging Service (MMS) messages, voice messages or the like as long as the user can be informed of reaching the threshold by the notifications.

In the illustrated example, servers such as 29, 39, 48, 49, 50 and 51 are intended to represent a general class of data processing device commonly used to run "server" programming. Each such device typically runs a general server type program and one or more application programs on top of the server programming, to implement the respective functionality. Such a device typically utilizes general purpose computer hardware to perform its respective server processing and to perform the attendant communications via the network(s). Each such server for example includes a data communication interface for packet data communication. The server also includes a central processing unit (CPU), in the form of one or more processors, for executing program instructions. The server platform also includes program storage and data storage for various data files to be processed and/or communicated by the server. The hardware elements operating systems and programming languages of such servers are conventional in nature, and it is presumed that those skilled in the art are adequately familiar therewith.

When a subscriber establishes an account with the carrier for packet data service, appropriate provisioning is made at the AAA server 49 and in the usage control server 48 to allow the subscriber to receive data packet communication service. The AAA server 49 acts as a proxy for the user's RADIUS messages, except accounting messages. The AAA server 49 proxies the RADIUS messages to the provisioned usage control server 48. The AAA server adds relevant information (e.g., MIP attributes) to the received RADIUS messages from the usage control server 48.

When the subscriber initiates a data communication session, the AAA server 49 proxies the RADIUS Access-Request to the usage control server 48. The usage control server 48 checks the user's balance, and session termination capabilities of the serving PDSN and the user's HA, and grants access via a network node by providing a quota to the node for the particular call.

Figure 2:
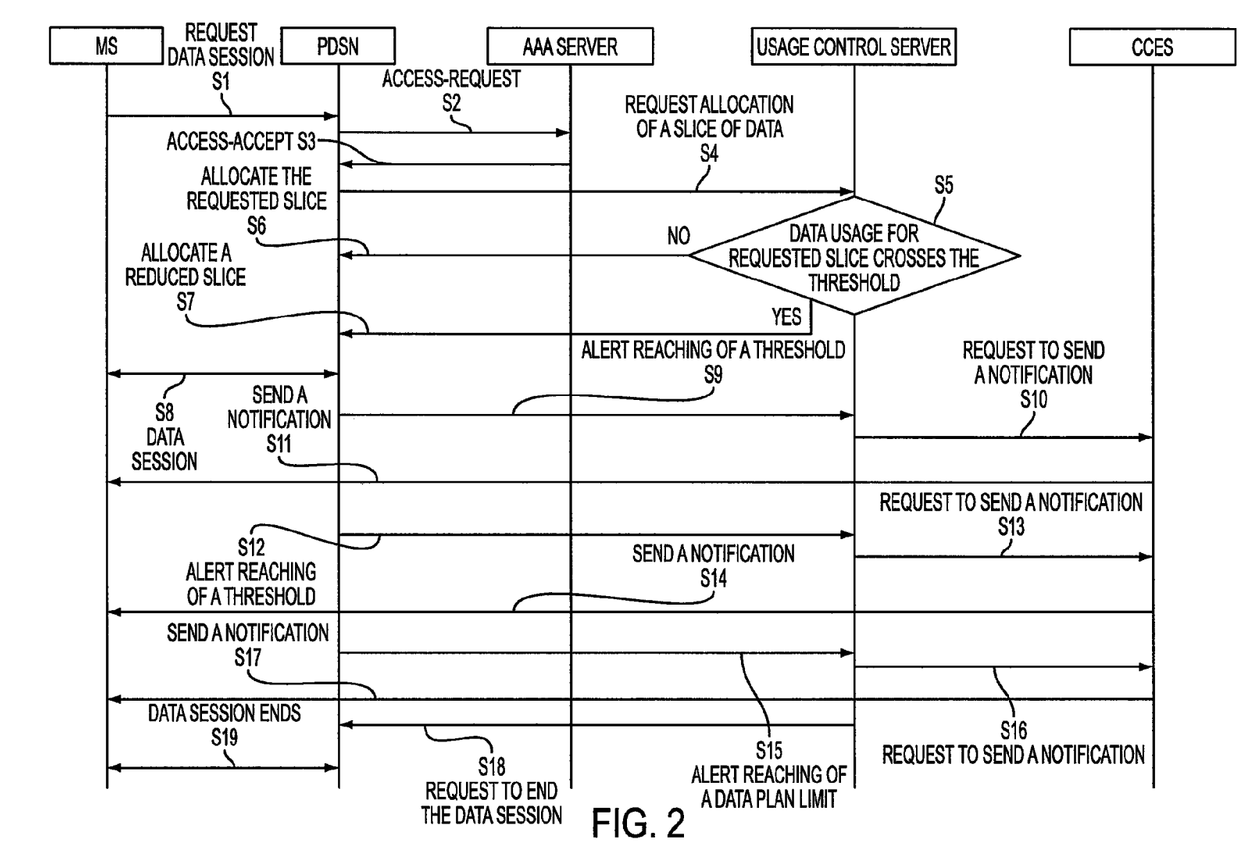
FIG. 2 is a flowchart illustrating a process for sending a threshold notification to a mobile station user.

FIG. 2 is a flowchart illustrating a process for sending a threshold notification to a mobile station user. The illustrated process sends two notifications at two levels of data consumed in a pre-allotted data plan limit. The number of notifications and the levels of data consumed, at which the notifications are sent to the mobile station, may vary.

The mobile station 17 initiates sending a request for a data session to the PDSN 47. (S1) The request includes information on requested data such as amount of data and source of the requested data, and the mobile station user's Identification (ID) and password. After receiving the data session request from the PDSN 47, the PDSN 47 sends a RADIUS Access Request message, which requests authentication of the data session and includes the mobile station user's ID and password, to the AAA server 49. (S2) The AAA server 49 authorizes or denies access to the packet data communication based on the mobile station user's ID and password by referring to mobile stations users' profile stored therein. (S3) The AAA server 49 forwards the request to the usage control server 48, and checks whether the mobile station user has a valid account and a valid balance in his or her account, and permits the access to the data communication. The usage control server 48 sends a RADIUS Access Accept message to the PDSN 47, if the mobile station user has a valid account and a valid balance.

After receiving the RADIUS Access Accept message from the AAA server 49, the PDSN 47 sends a request for allocation of a slice of data corresponding the requested data session to the usage control server 48. (S4) The usage control server 48 stores each user's data plan, remaining data quota or amount of data and specified data slice thresholds at which the user wants to receive notifications. The data slice thresholds may be pre-set by the user via the ESM server 51. The usage control server 48 retrieves user's account including information on user's data usage balance reflecting an amount of data usage remaining under the data plan and user's specified data slice thresholds at which the threshold notification will be sent to the mobile station, and checks if data usage corresponding to the requested slice of data crosses the threshold level of data.(S5)

If the data usage corresponding to the requested slice of data does not cross the threshold level of data, the usage control server 48 allocates the requested slice of data and sends the requested slice of data as a quota for data usage for the data session, with a pre-determined data slice threshold. (S6) If the data usage corresponding to the requested slice of data crosses the notification threshold level of data, the usage control server 48 allocates a slice of data and a data slice threshold that equals to a difference between a starting value of previously consumed data under the user's plan and threshold level of data, and send the slice with the reduced data slice threshold for the data slice, for data usage of the data session. (S7)

After a slice of data is allocated as a quota for the requested data session by the usage control server 48, the data session starts between the mobile station 17 and a resource of the requested data via the PDSN 47. (S8) The resource of the requested data is a server for providing the data requested by the mobile station 17, e.g. music download website, news website, etc. During the data session, the PDSN 47 keeps counting traffic flow of the data session. When the amount of data consumed reaches the data slice threshold, the PDSN 47 returns to update the usage control server 48 with the consumed data. At this time, the usage control server 48 checks if the last update of the consumed data reaches the first data slice threshold, e.g. 4.0 GB for 5.0 GB data plan. (S9) The first data slice threshold is less than the maximum user data plan limit and is set by the user. On confirming that the notification threshold is reached, the usage control server 48 request the CCES 51 to send a notification of reaching the first threshold to the mobile station 17. (S10) In the meantime, the usage control server 48 may send a new quota for the requested data session considering reaching of the first data slice threshold. The CCES 51 sends the notification of reaching the first threshold to the mobile station 17 as requested by the usage control server 48. (S11). The notification may take a form of a SMS, a MMS, a voice message, or the like.

The PDSN 49 continues to count the traffic flow of the ongoing data session and alerts the usage control server 48 of reaching a second data slice threshold, e.g. 4.5 GB when the amount of the data consumed reaches the second threshold. (S12). The second threshold is less than the maximum data plan limit, and set by the user. Upon receiving the notification, the usage control server 48 request the CCES 51 to send another notification of reaching the second threshold to the mobile station 17. (S13) In the meantime, the usage control server 48 may send a new quota for the requested data session considering reaching of the first data slice threshold. The CCES 51 sends the notification of reaching the second threshold to the mobile station 17 as requested by the usage control server 48. (S14).

As new data slice are provided to the PDSN 47, the usage control server 48 monitors the total data consumed and will provide a final data slice. In the final data slice, the slice size and data slice threshold will be the same. While counting the traffic flow of the data session, if the data consumed reaches the final data slice that is the maximum data plan limit, e.g. 5 GB, the PDSN 47 alerts the usage control server 48 of reaching the data plan limit. (S15) Upon reaching of the data plan limit, the usage control server 48 request the CCES 51 to send another notification of reaching the data plan limit to the mobile station 17. (S16) The CCES 51 sends the notification of reaching the data plan limit to the mobile station 17 as requested by the usage control server 48. (S17). In the meantime, the usage control server 48 requests the PDSN 47 to close the ongoing data session upon reaching the data plan limit. (S18) The data session between the mobile station 17 and the resource is closed or hard stopped. (S19) Alternatively, the data session may not be closed by allocating a new data slice for continuing data usage capability or soft stopped.

Figure 3:
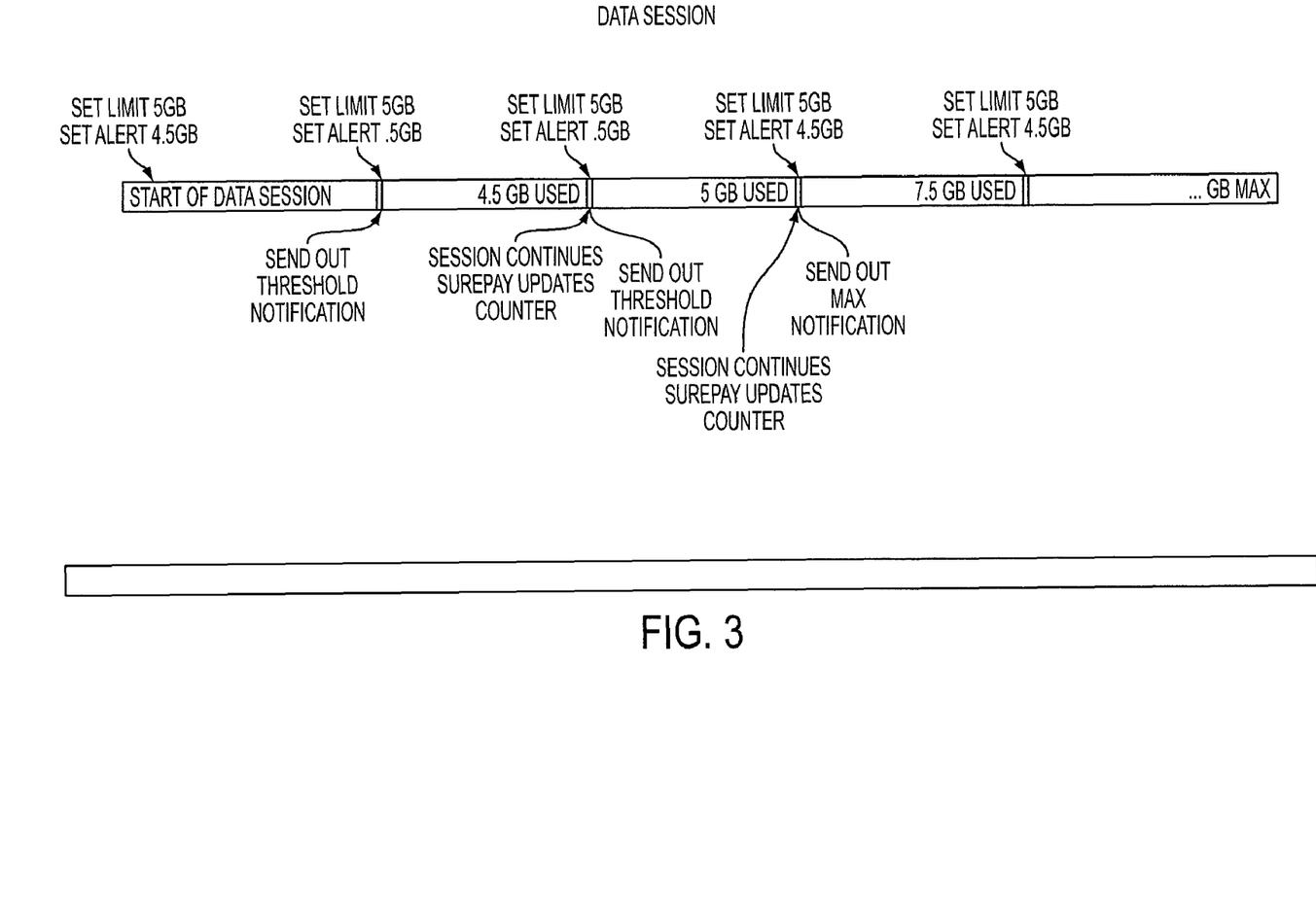
FIG. 3 illustrates an example which sends multiple threshold notifications in real time to a mobile station during a long data communication session.

FIG. 3 illustrates an example which sends multiple threshold notifications in real time to a mobile station during a long data communication session. In the illustrated example, data usage limit is set as 5 GB, and the mobile station user sets three threshold levels of data, 4 GB, 4.5 GB and 5 GB respectively, at which the threshold notifications are sent to the mobile station. The threshold levels of data can be set as the user wants via the ESM server 50, which allows the user to manage data usage within his or her data plan limit effectively. A long data session starts before the three threshold levels and will continue beyond the data usage limit, 5 GB. During the long data session, the PDSN 47 counts the traffic flow from the PDSN 47 to the mobile station 17 and checks if the data usage reaches the threshold levels. When the data usage reaches the first, second and third threshold levels, 4 GB, 4.5 GB, 5 GB, respectively, the threshold notifications are sent to the mobile station 17, without interruption of the data session. Since the notifications are sent to the mobile station even during the data session, the mobile station user can know reaching of or closing in on the pre-set data plan limit in real time.

Figure 4:
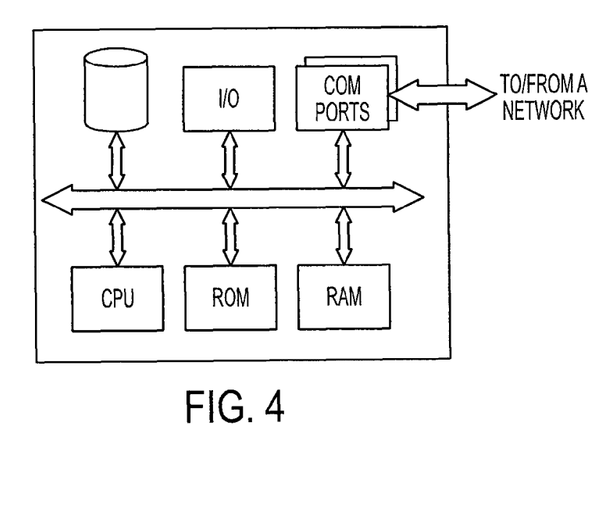
FIG. 4 illustrates a network or host computer platform, as may typically be used to implement a server.
Figure 5:
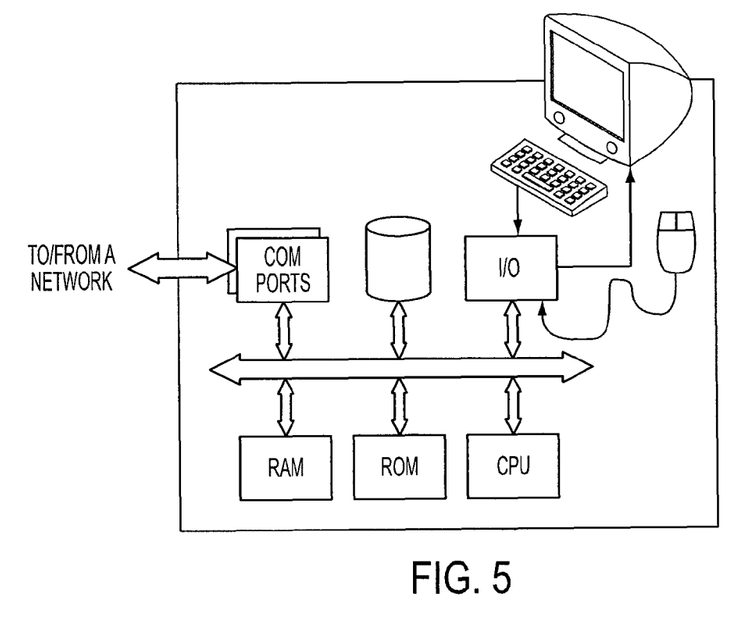
FIG. 5 depicts a computer with user interface elements, as may be used to implement a personal computer or other type of work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of matching the descriptive texts of music or the like outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the catalog manager, the API, the media store platform, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for notifying a mobile station user of reaching of a notification threshold level of data usage via a wireless communication network, an account of the mobile station user having a maximum data plan limit defined by a user's plan and a data usage balance reflecting an amount of data usage remaining under the plan, the method comprising steps of:

responsive to one or more data sessions of the user's mobile station, receiving requests for allocation of a slice of data usage from the data usage balance under the user's plan, from a node of a mobile wireless communication network, wherein data communication of the user's mobile station are routed through and monitored through the node;

in response to each request, determining if data usage corresponding to the requested slice would cross the notification threshold level of data usage;

for a request where the data usage corresponding to the requested slice would not cross the notification threshold level of data usage, allocating the requested data slice, and notifying allocation of the requested slice to the node as a quota for data usage of the mobile station;

for a request where the data usage corresponding to the requested slice would cross the threshold level of data usage, allocating a reduced data slice equal to the difference between a starting value of previously consumed data under the user's plan and the threshold, and notifying allocation of the reduced data slice to the node as a quota for data usage of the user's mobile station during a respective data session;

upon receiving a message from the node indicating that data usage of the user's mobile station during the respective data session has consumed the reduced data slice, so that data usage of the user's mobile station has reached the threshold, sending a notification of reaching the threshold to the mobile station in real time.

2. The method of claim 1, wherein the threshold is set by the mobile station user.

3. The method of claim 1, wherein the threshold includes multiple thresholds, and multiple notifications of reaching the multiple thresholds are sent to the mobile station in real time, at the time when the data usage has reached the multiple thresholds.

4. The method of claim 1, wherein the notification is in a form of a Short Message Service (SMS) message, a Multimedia Messaging Service (MMS) message, or a voice message.

5. The method of claim 1, wherein the notification is sent in real time when the data usage reaches the notification threshold level of data without a time gap between the time at which the threshold is reached and the time of sending the notification.

6. The method of claim 1, wherein the data usage is counted by a Packet Data Serving Node (PDSN) to route traffic flowed between the mobile station and the mobile wireless communication network.

7. The method of claim 1, wherein the threshold is less than the maximum data plan limit.

8. A system for notifying a mobile station user of reaching of a notification threshold level of data via a wireless communication network, an account of the mobile station user having a maximum data plan limit defined by a user's plan and a data usage balance reflecting an amount of data usage remaining under the plan, the system receiving a request for allocation of a data slice from the data usage balance in response to a request for a data session from a node of the wireless communication network, the system comprising:

a Packet Data Serving Node (PDSN) that routes traffic including the request for allocation of a slice of data and the data session, counts amount of data transmitted between the mobile station and the resource in real time, and updates the data usage balance reflecting the counted amount of data transmitted in real time; and a usage control server that, in response to the data session request, determines if data usage corresponding to the requested slice would cross the threshold level of data usage, and decides to send a threshold notification at the time when the data usage balance reaches the threshold level of data, wherein the usage control server allocates the requested slice and notifies allocation of the requested slice to the node as a quota for data usage of the mobile station for a request where the data usage corresponding to the requested slice would not cross the threshold level of data usage, and the usage control server allocates a reduced data slice equal to the difference between a starting value of previously consumed data under the user's plan and the threshold, and notifies allocation of the reduced data slice to the node as a quota for data usage of the user's mobile station during a respective data session for a request where the data usage corresponding to the requested slice would cross the reduced notification threshold level of data usage; and a Customer Communication Enterprise Service (CCES) server for sending the threshold notification to the mobile station in response to the usage control server's decision to send the notification.

9. The system of claim 8, further including:

an Authentication, Authorization and Accounting (AAA) server for receiving a request for access to data communication services provided by the wireless network from the PDSN and permitting the access to the data communication services by referring to profile of the mobile station user.

10. The system of claim 8, further including:

an Enhanced Service Manager (ESM) gateway connected to the usage control server for providing an interface for setting the threshold level of data by the mobile station user.

11. A processor-readable medium tangibly embodying a set of processor-executable instructions, wherein execution of the instructions causes a processor to perform operations for notifying a mobile station user of reaching a notification threshold level of data via a wireless communication network, an account of the mobile station user having a maximum data plan limit defined by a user's plan and a data usage balance reflecting an amount of data usage remaining under the plan, the operations comprising:

responsive to one or more data sessions of the user's mobile station, receiving requests for allocation of a slice of data usage from the data usage balance under the user's pre-paid plan, from a node of a mobile wireless communication network, wherein data communication of the user's mobile station are routed through and monitored through the node;

in response to each request, determining if data usage corresponding to the requested slice would cross the notification threshold level of data usage;

for a request where the data usage corresponding to the requested slice would not cross the notification threshold level of data usage, allocating the requested slice and notifying allocation of the requested slice to the node as a quota for data usage of the mobile station;

for a request where the data usage corresponding to the requested slice would cross the threshold level of data usage, allocating a reduced slice equal to the difference between a starting value of previously consumed data under the user's pre-paid plan and the threshold, and notifying allocation of the reduced slice to the node as a quota for data usage of the user's mobile station during a respective data session;

upon receiving a message from the node indicating that data usage of the user's mobile station during the respective data session has consumed the reduced slice, so that data usage of the user's mobile station has reached the threshold, sending a notification of reaching the threshold to the mobile station in real time.

12. The processor-readable medium of claim 11, wherein the threshold level of data is set by the mobile station user.

13. The processor-readable medium of claim 11, wherein the threshold includes multiple thresholds, and multiple notifications of reaching the multiple thresholds are sent to the mobile station in real time, at the time when the data usage has reached the multiple thresholds.

14. The processor-readable medium of claim 1, wherein the notification is in a form of a Short Message Service (SMS) message, a Multimedia Messaging Service (MMS) message, or a voice message.

15. The processor-readable medium of claim 11, wherein the notification is sent in real time when the data usage reaches the threshold level of data without a time gap between the time at which the threshold is reached and the time of sending the notification.

16. The processor-readable medium of claim 11, wherein the data usage is counted by a Packet Data Serving Node (PDSN) to route traffic flowed between the mobile station and the mobile wireless communication network.

17. The processor-readable medium of claim 1, wherein the threshold is less than the maximum data plan limit.

\* \* \* \* \*